Figure 1:
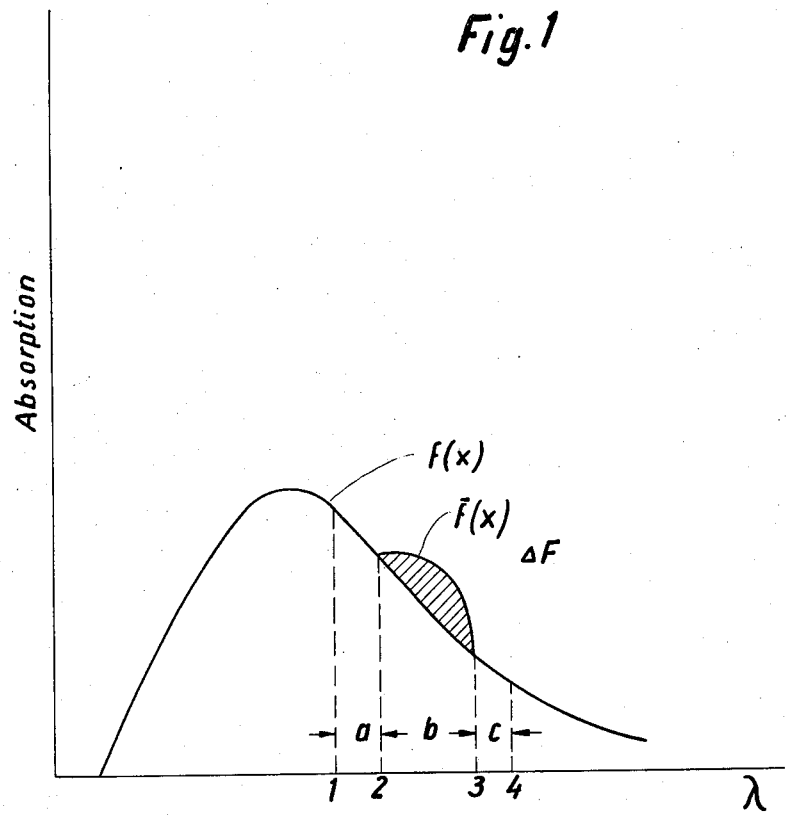

United States Patent [19]
Braunlich

[11] 3,803,384
[45] Apr. 9, 1974

[54] METHOD OF CONTINUOUSLY MEASURING ORGANIC SUBSTANCES IN WATER, AND DEVICE FOR CARRYING OUT THE METHOD

[75] Inventor: Gangolf Braunlich, Heidelberg, Germany

[73] Assignee: Brown, Boveri & Cie AG, Mannhiem, Germany

[22] Filed: Dec. 26, 1972

[21] Appl. No.: 318,431

[30] Foreign Application Priority Data
Dec. 24, 1971 Germany............................ 2164670

[52] U.S. Cl.................. 250/345, 250/338, 250/340
[51] Int. Cl. .......................................... G01h 23/12
[58] Field of Search........ 250/43.5 R, 43.5 D, 83 R, 250/83.3 H, 338, 340, 345

[56] References Cited
UNITED STATES PATENTS
| | | | |
|---|---|---|---|
| 3,431,411 | 3/1969 | Harrick | 250/43.5 R |
| 3,327,117 | 6/1967 | Kamentsky | 250/43.5 R |
| 3,462,596 | 8/1969 | Sanders | 250/43.5 R |

OTHER PUBLICATIONS
C.I.C. Newsletter Sept. 1961 Wilks, Jr.
"A.T.R.–New Infrared Sampling Tech."
C.I.C. Newsletter Jan. 1962 "Broad New Applications developed for A.T.R."

Primary Examiner—James W. Lawrence
Assistant Examiner—B. C. Anderson
Attorney, Agent, or Firm—Herbert L. Lerner

[57] ABSTRACT

Method of continuously measuring the volumetric proportion of organic substances in water includes, alternatingly at periodic intervals, measuring by infrared photometry the absorption of a water sample within a range wherein only the OH valences of the water absorb, so as to obtain a first measured value measuring by infrared photometry the absorption of the water sample in a second range wherein the OH valances of the water and the CH valences of the organic substances absorb, so as to obtain a second measured value and determining the difference between the first measured value multiplied by a constant factor and the second measured value and device for carrying out the foregoing method.

6 Claims, 2 Drawing Figures

METHOD OF CONTINUOUSLY MEASURING ORGANIC SUBSTANCES IN WATER, AND DEVICE FOR CARRYING OUT THE METHOD

The invention of the instant application relates to a method for continuously measuring the volumetric proportion of organic substances in water, and particularly, by means of infrared photometry, as well as a device for carrying out this method.

Organic substances are decomposed in water by comsuming oxygen, and therefore, conclusion can be drawn from the amount of the organic substances in water as to the future demand for biological oxygen in the water. It is, therefore, important to know the amount of organic substances in water, so that counter measures can be taken in time if the oxygen content of the water appears to be too low.

Several methods for determining the organic substances in water have become known. One of these methods is the so-called hot oxidation method wherein water with organic substances is heated to very high temperatures, so that the organic substances are oxidized by the available oxygen. The decrease in the oxygen is then measured. According to another method, a water sample is drawn and reacted with a solvent by which organic substances are shaken out or extracted. Thereafter, an infrared spectrograph is made and evaluated. All of these methods are discontinuous or batch-type methods which can be controlled and carried out in the laboratory but are not suited, however, as the basis for a continuously functioning industrial measuring device.

The difficulty in detecting organic substances in the presence of water by means of an infrared method consists mainly of the fact that water itself exhibits very strong infrared absorption, by which the infrared absorption of the organic substances is very extensively masked.

The absorption bands of interest in this regard, namely the OH and the CH valence bands, are in the range between about 2.7 and 3.7 $\mu$, and the absorption maxima are only slightly displaced with respect to one another. It is, therefore, very difficult to determine to absorption photometrically in this range of wavelengths. It has been known heretofore to employ two light beams and to let one beam pass through the sample and the other through a reference standard. This method is inaccurate, however, because any difference between the sample and the reference standard, such as temperature, layer thickness, turbidity, and the like, enter as errors into the measurement. This method demands, therefore, very great cleanliness, and is consequently unsuited for an industrial measuring instrument. This applies all the more to the determination of the organic content of waste water, in which turbidity is always unavoidably found.

A method of measuring the water content of a travelling web, such as, for example, a paper web, by infrared radiation is in fact known, the travelling web being irradiated with infrared radiation in two wavelength ranges and the reflected radiation components being measured (note: the German publication Wochenblatt fuer Papierfabrikation, page 71, 1969). This known method, however, contributes no new teaching to the determination of organic substances in water, since only a single substance, namely water, is measured by reflection or, more accurately, by re-emission, for which purpose other wavelength ranges are employed.

Moreover, this heretofore known method is not adequately accurate for the purposes of the instant application, since it is necessary only to determine the water content of paper to, for example, within 1 percent accuracy whereas the problem which is to be solved by the invention of the instant application requires a sought-after detection limit of at most a few parts per million.

It is, therefore, an object of the invention of the instant application to provide a method of measuring the volumetric proportion of organic substances in water which can be carried out continuously and is suitable to form the basis for an industrial measuring device according to the invention.

With the foregoing and other objects in view, there is provided in accordance with the invention, method for continuously measuring the volumetric proportion of organic substances in water, which comprises, alternatingly at periodic intervals, measuring by infrared photometry the absorption of a water sample within a range wherein only the OH valences of the water absorb so as to obtain a first measured value and measuring by infrared photometry the absorption of the water sample in a second range wherein the OH valences of the water and the CH valences of the organic substances absorb so as to obtain a second measured value, and determining the difference between the first measured value multiplied by a constant factor and the second measure value.

In accordance with another feature of the method of the invention, the absorption measurements are carried out within the stretching vibrations of the molecules or normal vibrations (Barrow, Introductions to Molecular Spectroscopy, p. 118).

In a device for carrying out the foregoing method of the invention, consideration must be given to the fact that the infrared absorption is very high. This means that the water samples to be examined should be in very thin layers. Narrow or thin flow-through curvettes or bulbs cannot, however, be used in an industrial measuring device, especially for waste water, because such curvettes soil rapidly and are difficult to clean. Consideration must furthermore be given to the fact that optical systems which are costly with respect to price as well as to the time required for adjustment thereof, are disadvantageous in an industrual measuring device.

Accordingly, the device of the invention in the instant application for carrying out the method of the invention has been based upon the so-called ATR method known per se and described, for example, in "Spectrochimica Acta", volume 17, pages 698 to 709 (1961), under the title "*Attenuated total reflection*" (emphasis added). This ATR method utilizes the phenomenon wherein the intensity of a light beam totally reflected at the boundary layer or interface between an optically denser and an optically less dense medium is attenuated if the less dense medium absorbs at the wavelength of the employed light beam.

The attenuation of the light intensity occurring for each reflection corresponds to the attenuation of the light beam by a layer of absorbing medium having a thickness which is substantially equal to the wavelength used. It is, therefore, possible, by selecting a suitable number of total reflections, to simulate a wide range of thin layers.

It is accordingly a further object of the invention to provide an industrially useable device for carrying out the method of continuously measuring the volumetric proportion of organic substances in water which avoids the necessity for costly optical systems.

With the foregoing and other objects in view, there is, therefore, provided in accordance with the invention of the instant application, a device for carrying out the method of continuously measuring the volumetric proportion of organic substances in water, comprising a flow channel for water samples to be measured continuously, the flow channel having a lateral wall, a planoparallel plate optically denser than the water sample to be measured being disposed in the wall, the plate having bevelled lateral wall surfaces through which light beams are reflectively passable through the plate, at least two laser light-emitting diodes disposed relative to the plate so that light beams from the diodes are able to traverse the plate in a path constituting multiple total reflection therein, means for alternatingly gating the diodes at periodic intervals, and at least one light detector means with after-connected am-plifying means for respectively detecting the light rays from the diodes and amplifying the resulting signal from the detector means, the detector means and the amplifying means being gatable in synchronism with the gating of the diode by the gating means.

In accordance with an additional feature of the device of the invention, one of the laser light-emitting diodes is constructed to emit a light beam having a wavelength within the wave number range between 2,800cm$^{-1}$ and 3,100cm$^{-1}$, and the other of the laser light-emitting diodes is constructed to emit a light beam having a wavelength within the wave number range between 2,650cm$^{-1}$ and 2,700cm$^{-1}$.

In accordance with yet another feature of the device of the invention, the planoparallel plate if formed of sapphire, because sapphire is resistant to acidic as well as alkaline waste water, and is, furthermore, so hard that mechanical cleaning thereof, for example, with brushes, is possible without impairing the surface thereof.

By employing gated laser light-emitting diodes, special monochromators, such as selective filters, can be dispensed with, as well as choppers or other moving or rotating screens or diaphragms. Furthermore, the lightbeam guidance becomes considerably simpler because the coherence of the laser light is good, and also the after-connected amplifiers are constructed as voltage amplifiers so that problems such as that of zero drift, which are common in dc-amplifiers, are eliminated.

Other features which are considered as characteristic for the invention are set forth in the appended claims.

Although the invention is illustrated and described herein as method for continuously measuring organic substances in water and device for carrying out the method, it is nevertheless not intended to be limited to the details shown, since various modifications may be made therein without departing from the spirit of the invention and within the scope and range of equivalents of the claims.

Figure 2:
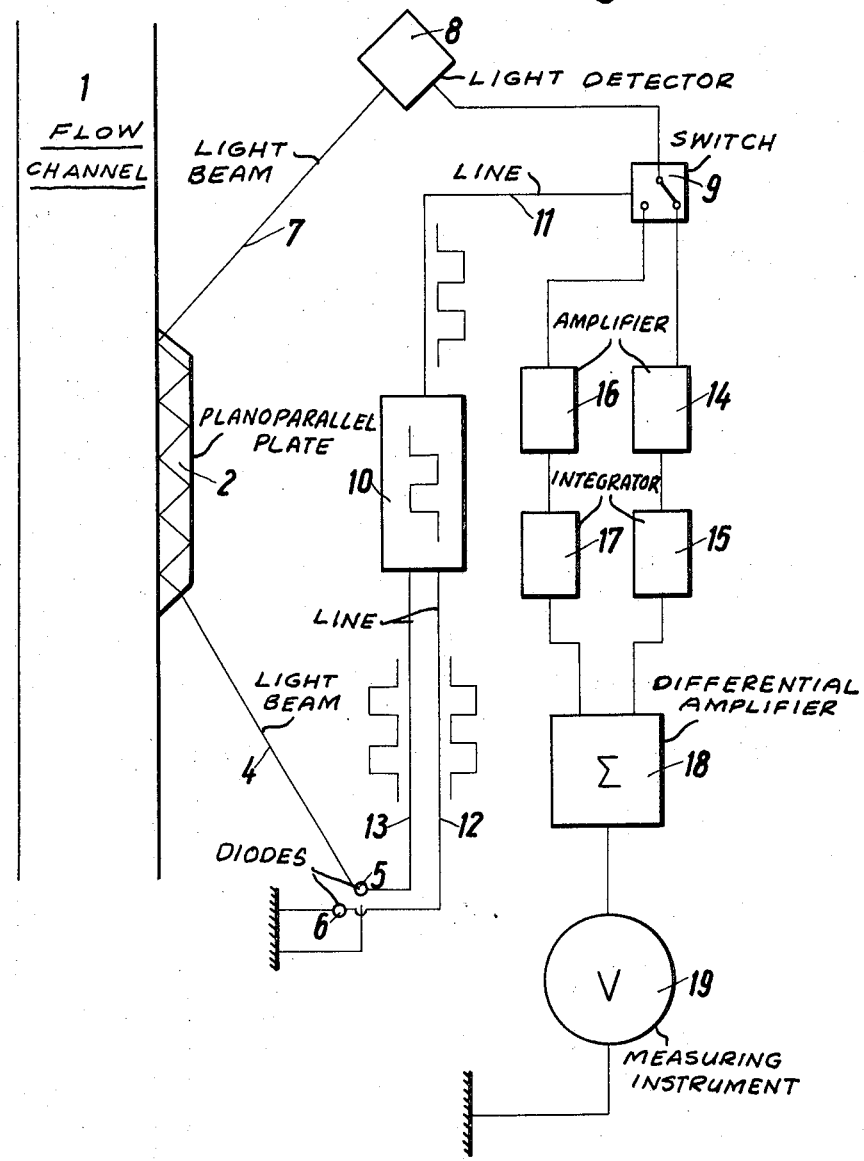

The invention, however, together with additional objects and advantages thereof will be best understood from the following description when read in connection with the accompanying drawing, in which:

FIG. 1 is a plot diagram of absorption against wavelengths illustrating the principle of the method of continuously measuring organic substances in water according to the invention; and FIG. 2 is a schematic view of the device for carrying out the method.

Referring now to the drawing and first, particularly, to FIG. 1 thereof, there is shown therein a plot diagram of wavelengths on the abscissa against absorption on the ordinate. The illustrated curve $f(x)$ is supposed to correspond to the water absorption, while the additional component of the CH valences is represented by the curve $\bar{f}(x)$. As is readily apparent, only the water absorption can be measured within the wavelength range 1–2, while in the range 2–3 only the combined absorption of water and organic substances is amenable to measurement.

The absolute value of the water absorption depends upon external influences. In a first approximation, however, the course of the absorption curve is maintained. If the integral absorption in the range 1–2 is consequently determined, which is photometrically possible without great difficulty, the absorption component of the water in the wavelength range 2–3 can be calculated. If this calculated absorption component of the water is subtracted from the similarly photometrically determinable integral absorption within the range 2–3, the absorption component of the organic substances is the remainder. The accuracy of the measurement can be further increased if the integral absorption within the range 3–4, wherein the organic substances are again transparent to the infrared rays, is used as additional compensation value.

In FIG. 2, there is shown schematically and highly simplified, the device for carrying out the method according to the invention.

There is thus shown in FIG. 2, a flow channel 1, through which the water samples to be tested flow in a continuous stream. Into the wall of the flow channel 1, there is inserted a plano-parallel plate 2 formed preferably of sapphire and having margins that are bevelled in such a way that light beams 4, which are emitted by laser light-emitting diodes 5 and 6, can penetrate the planoparallel plate 2 at one marginal or lateral surface thereof, experience multiple total reflection therein and re-emerge at the other and opposite marginal surface as a light beam 7. For the sake of simplicity, only a single light beam is shown, since the laser light beams from the two laser light-emitting diodes 5 and 6 travel very closely together, and since the coincidence of the beam paths of the two laser light-emitting diodes 5 and 6 is also attainable by optical means. The re-emerging light beam 7 ultimately impinges on a light detector 8.

Optical means that might possibly be required for focusing or respectively deflecting or reversing the light beams from the laser diodes have not been illustrated in the drawing, as the man of ordinary skill in the art is surely familiar with them. Since laser light exhibits good coherence and since the light leaves the laser diode as a sharply focused thin band of light, the cost of optical devices can be kept very low.

The output signal of the light detector 8 is fed to an electronic switch 9, which is switched back and forth by a pulse generator 10 through a line 11. In synchronism with the switching of the switch 9, the two laser light-emitting diodes 5 and 6 are alternatingly excited by the pulse generator 10 through the lines 12 and 13.

Further processing of the output singal of the light detector 8, which appears alternatingly at the upper and lower output of the switch 9, can be effected by conventional electronics. In the illustrated embodiment of FIG. 2, two amplifiers 14 and 16 are connected respectively to the outputs of the switch 9, one of the amplifiers having an amplification factor V and the other a factor $k \times V$, where $k$ is a number which may be larger or also smaller than 1. The value of $k$ depends on the selected reference wavelength, at which only water, and not organic substances absorb. Assemblies of respective rectifiers with after-connected integrators 15 and 17 having time constants which can be made equal, can be connected to the respective amplifiers 14 and 16. The output signals of the integrators of the assemblies 15 and 17 are fed, in the case of the illustrated embodiment, to a differ-ential amplifier 18, whose output level is indicated by a measuring instrument 19.

Since the switch 9 is switched back and forth synchronously with the gating of the laser light-emitting diodes 5 and 6, a fixed relationship exists between the laser light-emitting diodes 5 and 6, on the one hand, and the two amplification channels 14, 15 and 16, 17. If the laser light-emitting diodes 5 and 6 are therefore chosen of such construction that one thereof emits laser light in the wave number range between $2,650cm^{-1}$ and $2,700cm^{-1}$ and the other thereof emits laser light in the wave number range between $2,800cm^{-1}$ and $3,100cm^{-1}$, it is readily apparent that only the water absorption is detected by photometric measurement with light from the first mentioned diode, and joint absorption of water and organic substance is detected by photometric measurement with the light from the second laser diode. No difficulties are then presented to process the two measured values in the manner described hereinbefore.

The invention of the instant application accordingly, encompasses a method for determining the volumetric proportion of organic substances in water, which is very sensitive, is applicable to waste water since the measured values are minimally affected by dirt and turbidity, and which, furthermore, is suited for forming the basis for a continuously functioning industrial measuring device.

The device for carrying out the method of the invention is distinguished by the fact that it has no movable parts, that it requires only very little expenditure for optical means through the choice of laser light-emitting diodes as infrared light sources, and that it is easy to clean.

I claim:

1. Method for continuously measuring the volumetric proportion of organic sub-stances in water, which comprises, alternatingly at periodic intervals, measuring by infrared photometry the absorption of a water sample within a range wherein only the OH valences of the water absorb so as to obtain a first integrated value and measuring by infrared photometry the absorption of the water sample in a second range wherein the OH valences of the water and the CH valences of the organic substances absorb so as to obtain a second integrated value, and determining the difference between the first integrated value multiplied by a constant factor, and the second integrated value.

2. Method according to claim 1 wherein the absorption measurements are carried out within the stretching vibrations of the molecules.

3. Apparatus for continuously measuring the volumetric proportion of organic substances in water, comprising a flow channel for water samples to be measured continuously, said flow channel having a lateral wall, a plano-parallel plate optically denser than the water sample to be measured being disposed in said wall, said plate having bevelled lateral wall surfaces through which light beams are reflectively passable through said plate, at least two laser light-emitting diodes disposed relative to said plate so that light beams from said diodes are able to traverse said plate in a path consitituting multiple total reflection therein, one of said diodes being con-structed to emit an infrared light beam of a range of wavelengths which only the OH valences of the water absorb and the other of said diodes being constructed to emit an infrared light beam of a range of wavelengths which the OH valences of the water and the CH valences of the organic substances absorb, means for alternatingly gating said diodes at periodic intervals, at least one light detector means with after-connected amplifying means for respectively detecting the light rays from said diodes and amplifying the resulting signal from said detector means, said detector means and said amplifying means being gatable in synchronism with the gating of said diode by said gating means, means for integrating the amplified signals resulting from respective light beams, and means for producing a signal responsive to the difference between the respective integrated signals.

4. Apparatus according to claim 3 wherein said planoparallel plate is formed of sapphire.

5. Apparatus according to claim 3 wherein one of said laser light-emitting diodes is constructed to emit a light beam having a wavelength within the wave number range between $2800cm^{-1}$ and $3,100cm^{-1}$, and the other of said laser light-emitting diodes is constructed to emit a light beam having a wavelength within the wave number range between $2,650cm^{-1}$ and $2,700cm^{-1}$.

6. Apparatus according to claim 3, including a respective amplifying means for the signal from the detector means for each of the respective light beams, the amplifying means for the light beam of a range of wavelengths which only the OH valences of the water absorb effecting a relative amplifi-cation equal to that of the other amplifying means multiplied by a constant factor.

* * * * *